United States Patent
Zivanovic et al.

(10) Patent No.: US 9,433,945 B2
(45) Date of Patent: Sep. 6, 2016

(54) GYRATORY CRUSHER BEARING

(71) Applicant: SANDVIK INTELLECTUAL PROPERTY AB, Sandviken (SE)

(72) Inventors: Predrag Zivanovic, Malmo (SE); Johan Gunnarsson, Sovde (SE); Konstantin Belotserkovskiy, Malmo (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/784,917

(22) PCT Filed: Mar. 31, 2014

(86) PCT No.: PCT/EP2014/056397
§ 371 (c)(1),
(2) Date: Oct. 15, 2015

(87) PCT Pub. No.: WO2014/170120
PCT Pub. Date: Oct. 23, 2014

(65) Prior Publication Data
US 2016/0144370 A1    May 26, 2016

(30) Foreign Application Priority Data
Apr. 16, 2013 (EP) .................................... 13163911

(51) Int. Cl.
| | |
|---|---|
| *B02C 2/04* | (2006.01) |
| *F16C 33/10* | (2006.01) |
| *F16C 17/10* | (2006.01) |
| *F16C 33/04* | (2006.01) |
| *F16N 21/00* | (2006.01) |
| *F16N 31/00* | (2006.01) |

(52) U.S. Cl.
CPC ................. *B02C 2/04* (2013.01); *B02C 2/042* (2013.01); *F16C 17/10* (2013.01); *F16C 33/04* (2013.01); *F16C 33/10* (2013.01); *F16N 21/00* (2013.01); *F16N 31/00* (2013.01)

(58) Field of Classification Search
USPC .................................................. 241/207–216
See application file for complete search history.

(56) References Cited

U.S. PATENT DOCUMENTS

| | | | | |
|---|---|---|---|---|
| 6,000,852 | A * | 12/1999 | Koenig | ................... B02C 18/16 384/282 |
| 6,325,545 | B1 | 12/2001 | Stangle et al. | |
| 2004/0035967 | A1 | 2/2004 | Johnson et al. | |
| 2006/0144979 | A1* | 7/2006 | Nieminen | ............... B02C 2/047 241/259 |

FOREIGN PATENT DOCUMENTS

| | | |
|---|---|---|
| DE | 10311841 A1 | 8/2004 |
| WO | 98/26188 A1 | 6/1998 |

* cited by examiner

*Primary Examiner* — Mark Rosenbaum
(74) *Attorney, Agent, or Firm* — Corinne R. Gorski

(57) ABSTRACT

A gyratory crusher bearing arranged for carrying a crushing head of a gyratory crusher having an inner crushing shell supported by the crushing head, and an outer crushing shell supported on a crusher frame. The gyratory crusher bearing includes a lubricant supply channel and a lubricant drainage channel. At least one of the lubricant supply channel and the lubricant drainage channel is arranged for housing a combined mounting and lubricant passage bolt holding the gyratory crusher bearing to a bearing support arranged on the crusher frame of the gyratory crusher.

15 Claims, 3 Drawing Sheets

GYRATORY CRUSHER BEARING

RELATED APPLICATION DATA

This application is a §371 National Stage Application of PCT International Application No. PCT/EP2014/056397 filed Mar. 31, 2014, claiming priority of EP Application No. 13163911.4, filed Apr. 16, 2013.

TECHNICAL FIELD OF THE INVENTION

The present invention relates to a gyratory crusher bearing for carrying a crushing head of a gyratory crusher of the type comprising an inner crushing shell, which is supported by the crushing head, and an outer crushing shell which is supported on a crusher frame, wherein the gyratory crusher bearing is connectable to a bearing support arranged on the crusher frame of the gyratory crusher.

The invention further relates to a gyratory crusher bearing arrangement, and a gyratory crusher comprising a gyratory crusher bearing.

Still further, the invention relates to a method of mounting a gyratory crusher bearing.

BACKGROUND OF THE INVENTION

A gyratory crusher may be utilized for efficient crushing of material, such as stone, ore, etc. into smaller sizes. The gyratory crusher is provided with an inner crushing shell and an outer crushing shell forming between them a crushing chamber. The inner crushing shell is arranged on a crushing head, which is made to perform a gyratory movement to effect crushing of material in the crushing chamber. The crushing head rests on a crushing head bearing which transfers the forces resulting from the crushing in the crushing chamber from the crushing head to the frame of the gyratory crusher. Lubricant is supplied to the bearing to achieve lubrication and cooling of the bearing surfaces. The lubricant may, for example, be hydraulic oil.

US 2004/0035967 discloses a gyratory crusher in which a drilled hole supplies lubricant to a crushing head bearing. However, the amount of lubricant supplied to the bearing is not easily controlled, which reduces the technical life of the gyratory crusher bearing.

SUMMARY OF THE INVENTION

An object of the present invention is to provide a gyratory crusher bearing which has improved durability compared to those of the prior art.

This object is achieved by means of a gyratory crusher bearing for carrying a crushing head of a gyratory crusher of the type comprising an inner crushing shell, which is supported by the crushing head, and an outer crushing shell which is supported on a crusher frame, wherein the gyratory crusher bearing is connectable to a bearing support arranged on the crusher frame of the gyratory crusher. The gyratory crusher bearing comprises a lubricant supply channel extending through at least a part of the gyratory crusher bearing and ending at a bearing surface of the gyratory crusher bearing, and a lubricant drainage channel extending through at least a part of the gyratory crusher bearing and starting at the bearing surface of the gyratory crusher bearing, wherein at least one of the lubricant supply channel and the lubricant drainage channel is adapted for housing a combined mounting and lubricant passage bolt holding the gyratory crusher bearing to the bearing support.

An advantage of this gyratory crusher bearing is that it can be provided with a relatively large amount of lubricant, since flow of lubricant over the bearing surface is promoted by the lubricant supply channel and the lubricant drainage channel. Thereby, the crusher bearing is well lubricated. Furthermore, the relatively large amount of lubricant provides cooling for the crusher bearing, which further increases its technical life. A still further advantage is that the gyratory crusher bearing is kept in its intended position, which reduces the risk that the bearing inadvertently leaves its intended position during operation or maintenance. By being adapted for housing the combined mounting and lubricant passage bolt in the lubricant supply and/or drainage channel the mechanical strength of the gyratory crusher bearing will be kept high, since only few holes needs to be provided in the bearing.

According to one embodiment the gyratory crusher bearing is provided with an abutment surface for co-operating with the combined mounting and lubricant passage bolt. An advantage of this embodiment is that the gyratory crusher bearing can be secured to the bearing support in an efficient manner.

According to one embodiment at least one of the lubricant supply channel and the lubricant drainage channel of the gyratory crusher bearing is provided with an abutment surface for co-operating with the combined mounting and lubricant passage bolt. An advantage of this embodiment is that the bearing is adapted for being efficiently held in place by the bolt, without requiring any advanced arrangement.

According to one embodiment the abutment surface is arranged adjacent to a lubricant inlet of the lubricant supply channel, and/or adjacent to a lubricant outlet of the lubricant drainage channel.

According to one embodiment the gyratory crusher bearing is connectable to a flow restricting orifice restricting the flow of lubricant through the lubricant drainage channel. An advantage of this embodiment is that the drainage of lubricant from the bearing surface is restricted, such that the film of lubricant becomes thicker and more efficient at lubricating the bearing surface.

According to one embodiment the gyratory crusher bearing in itself includes a flow restricting orifice restricting the flow of lubricant through the lubricant drainage channel. An advantage of this embodiment is that drainage of lubricant from the bearing surface is restricted, to make the film of lubricant thicker and more efficient at lubricating the bearing surface.

According to one embodiment the lubricant drainage channel is adapted for housing the combined mounting and lubricant passage bolt holding the gyratory crusher bearing to the bearing support. An advantage of this embodiment is that it is often more efficient to mount the bolt to the lubricant drainage channel, because the drainage channel need not be connected to a pressurized source of lubricant, which is the case with the lubricant supply channel.

According to one embodiment a lubricant inlet is arranged in the bearing surface and is connected to the lubricant supply channel, and a lubricant outlet is arranged in the bearing surface and is connected to the lubricant drainage channel, wherein the lubricant inlet and the lubricant outlet are arranged in opposite ends of the bearing surface. By "opposite ends" is here meant that there is an angular separation of 160-200° between the lubricant inlet and the lubricant outlet, as seen from above. An advantage of arranging the lubricant inlet and the lubricant outlet at opposite ends of the bearing surface is that the lubricant is made to flow a relatively long distance over the bearing surface, thereby making the lubrication more efficient.

According to one embodiment the bearing surface is adapted to be in contact with a lower surface of the crushing head. An advantage of this embodiment is that the crushing head is efficiently and steadily supported by the gyratory crusher bearing.

According to one embodiment the gyratory crusher bearing comprises a material selected from the group of materials consisting of: metals, metal alloys, ceramics, polymers. These materials, used alone or in combination, are suitable bearing materials for use in the gyratory crusher bearing.

According to one embodiment the gyratory crusher bearing forms a "collar" adapted to encircle a crushing shaft onto which the crushing head is mounted. This provides for particularly efficient and steady support of a crushing head, for example in an inertia cone crusher.

According to one embodiment the bearing surface of the gyratory crusher bearing is provided with at least one lubrication track. An advantage of this embodiment is that it provides for improved cooling of the bearing surface.

According to one embodiment the at least one lubrication track has a width of 5-100 mm. According to one embodiment the at least one lubrication track has a depth of 2-30 mm. These embodiments have the advantage of providing for a relatively large flow of lubricant, resulting in good cooling of the bearing surface.

According to one embodiment the at least one lubrication track extends from a lubricant inlet to a lubricant outlet of the bearing surface. This embodiment provides for a more efficient transport of lubricant over the bearing surface, thereby increasing the cooling and the lubrication of the bearing surface.

A further object of the present invention is to provide a gyratory crusher bearing arrangement which has a longer technical life than those of the prior art.

This object is achieved by a gyratory crusher bearing arrangement comprising a gyratory crusher bearing according to one or more of the described embodiments, the gyratory crusher bearing arrangement further comprising a bearing support, and a combined mounting and lubricant passage bolt arranged in at least at one of the lubricant supply channel and the lubricant drainage channel of the gyratory crusher bearing and fixing the gyratory crusher bearing to the bearing support.

An advantage of this gyratory crusher bearing arrangement is that it provides for efficient lubrication, a long technical life, and reduced risks in conjunction with operating and maintaining a crusher to which it is connectable.

According to one embodiment the combined mounting and lubricant passage bolt is arranged in the lubricant drainage channel.

According to one embodiment the combined mounting and lubricant passage bolt comprises a lubricant channel via which lubricant may pass by the bolt. An advantage of this embodiment is that the bolt will both have the function of being a device for holding the gyratory crushing bearing in its position on the bearing support, and, additionally, the bolt also has the function of being part of the lubricant channel, and allowing passage of lubricant therethrough.

According to one embodiment the lubricant channel of the bolt is an inner lubricant channel that extends through the centre of the bolt. An advantage of this embodiment is that the bolt may be efficiently manufactured and will obtain good mechanical strength. Furthermore, the inner lubricant channel will have predicable flow properties with regard to, for example, the resistance to flow of lubricant therethrough.

According to one embodiment the combined mounting and lubricant passage bolt comprises a flow restricting orifice restricting the flow of lubricant through the bolt. An advantage of this embodiment is that the amount and/or pressure of the lubricant on the bearing surface can be controlled by selecting a suitable flow restricting orifice. Hence, the restriction to drainage of lubricant from the bearing surface can be easily adjusted, by selecting the bolt, without having to modify the bearing itself.

According to one embodiment the flow restricting orifice is formed in an internal nut which is screwed into the lubricant channel of the bolt. This embodiment makes it very easy to adjust and modify the restriction to drainage of lubricant from the bearing surface, by just selecting and mounting an internal nut with a suitably sized restriction orifice.

A further object of the present invention is to provide a gyratory crusher which has a longer technical life than those of the prior art.

This object is achieved by a gyratory crusher comprising an inner crushing shell, which is supported by a crushing head, and an outer crushing shell which is supported on a crusher frame, the gyratory crusher further comprising a gyratory crusher bearing according to any of the embodiments described and/or a gyratory crusher bearing arrangement according to any of the embodiments described for supporting the crushing head.

An advantage of this gyratory crusher is that it will have a long technical life and will be easy and efficient to maintain.

According to one embodiment the gyratory crusher is of the inertia cone crusher type in which a gyratory movement of the crushing head is achieved by an unbalance weight. An advantage of this embodiment is that the crushing head of an inertia cone crusher rests on a relatively large and costly gyratory crusher bearing, which greatly benefits from the enhanced lubrication and cooling of the present gyratory crusher bearing. Furthermore, the fact that the bearing is secured to the bearing support greatly reduces the health risks associated with maintenance, since the risk is reduced that the crushing head inadvertently attaches to the bearing when being lifted from the crusher.

A still further object of the present invention is to provide a method of mounting a gyratory crusher bearing, such method being more efficient than the methods of the prior art.

This object is achieved by means of a method of mounting a gyratory crusher bearing for carrying a crushing head of a gyratory crusher of the type comprising an inner crushing shell, which is supported by the crushing head, and an outer crushing shell which is supported on a crusher frame, the method comprising:

arranging the gyratory crusher bearing on a bearing support arranged on the crusher frame of the gyratory crusher, inserting a combined mounting and lubricant passage bolt into at least one of a lubricant supply channel extending through at least a part of the gyratory crusher bearing and ending at a bearing surface of the gyratory crusher bearing, and a lubricant drainage channel extending through at least a part of the gyratory crusher bearing and starting at the bearing surface of the gyratory crusher bearing, and tightening the combined mounting and lubricant passage bolt to press the gyratory crusher bearing towards the bearing support.

An advantage of this method is that the gyratory crusher bearing is mounted in a manner which provides for low health risks and a long technical life.

Further objects and features of the present invention will be apparent from the following detailed description and claims.

BRIEF DESCRIPTION OF THE DRAWINGS

The invention is described in more detail below with reference to the appended drawings in which.

DESCRIPTION OF PREFERRED EMBODIMENTS

Figure 1:
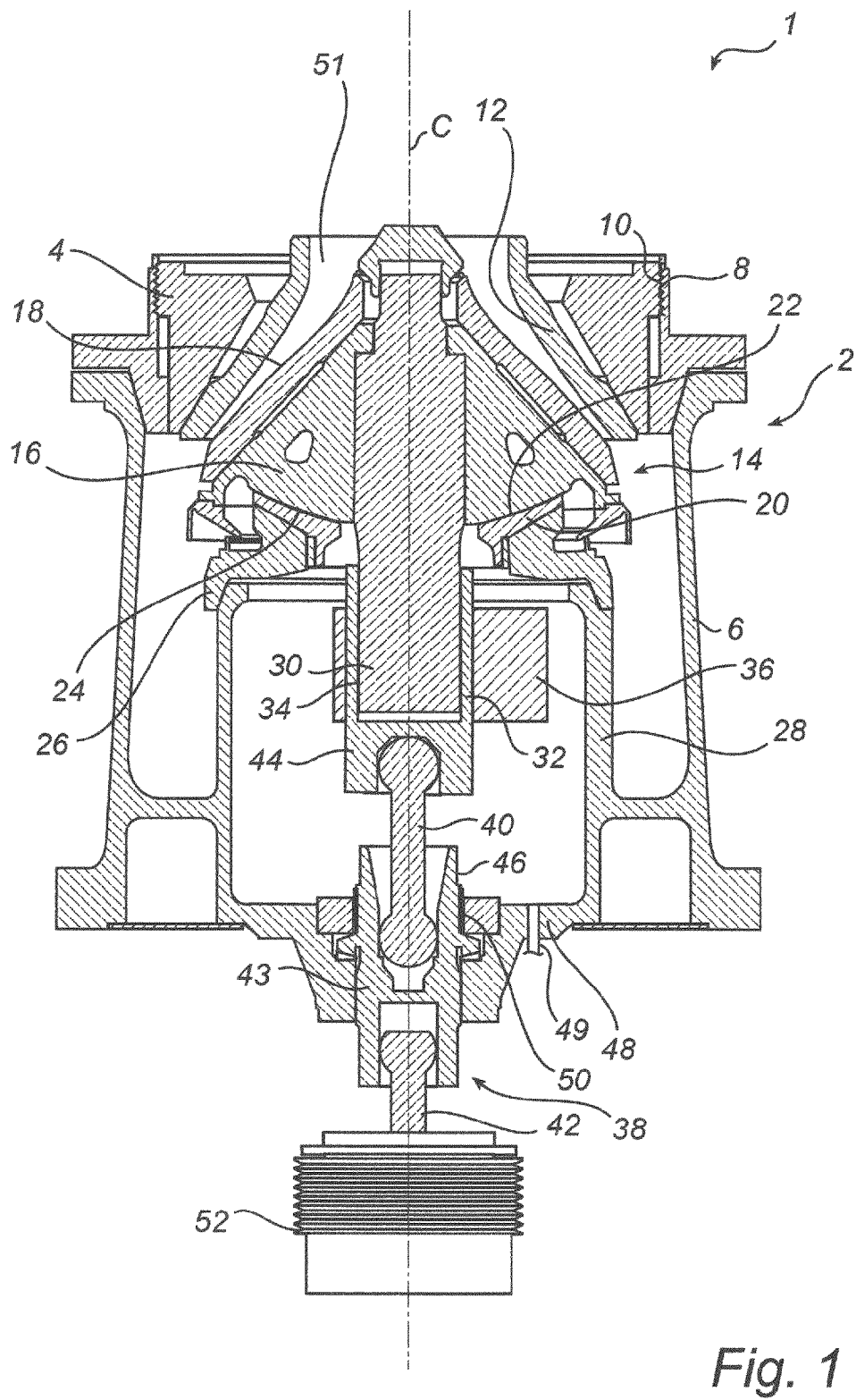
FIG. 1 is a schematic side view, in cross-section, of an inertia cone crusher.

FIG. 1 illustrates a gyratory crusher 1 in accordance with one embodiment of the present invention. The gyratory crusher illustrated in FIG. 1 is of the inertia cone crusher type. It will be appreciated that the present invention is applicable also to other gyratory cone crusher types. The gyratory crusher 1 comprises a crusher frame 2 in which the various parts of the crusher 1 are mounted. The crusher frame 2 comprises an upper frame portion 4, and a lower frame portion 6. The upper frame portion 4 has the form of a bowl and is provided with an outer thread 8 which co-operates with an inner thread 10 of the lower frame portion 6. The upper frame portion 4 supports, on the inside thereof, an outer crushing shell 12. The outer crushing shell 12 is a wear part which may be made from, for example, a manganese steel.

The lower frame portion 6 supports an inner crushing shell arrangement 14. The inner crushing shell arrangement 14 comprises a crushing head 16, which has the form of a cone and which supports an inner crushing shell 18, which is a wear part which may be made from, for example, a manganese steel. The crushing head 16 rests on a spherical gyratory crusher bearing 20. The gyratory crusher bearing 20 has an upper bearing surface 22 which is in bearing contact with a lower surface 24 of the crushing head 16. The bearing surface 22 of the crusher bearing 20 has an at least partly concave shape, and the lower surface 24 of the crushing head 16 has an at least partly convex shape. The gyratory crusher bearing 20 rests on a bearing support 26 which is mounted on an inner cylindrical portion 28 of the lower frame portion 6.

The crushing head 16 is mounted on a crushing shaft 30. The crushing shaft 30 extends through the gyratory crusher bearing 20. Hence, the gyratory crusher bearing 20 forms a "collar" encircling the crushing shaft 30. Similarly, also the bearing support 26 encircles the crushing shaft 30. At a lower end thereof, the crushing shaft 30 is encircled by a cylindrical sleeve 32. The cylindrical sleeve 32 is provided with an inner cylindrical bearing 34 making it possible for the cylindrical sleeve 32 to rotate around the crushing shaft 30.

An unbalance weight 36 is mounted on one side of the cylindrical sleeve 32. At its lower end the cylindrical sleeve 32 is connected to a vertical drive shaft 38. The drive shaft 38 comprises a ball spindle 40, a pulley shaft 42, an intermediate shaft 43 connecting the ball spindle 40 to the pulley shaft 42, an upper connector 44 which connects the ball spindle 40 to the cylindrical sleeve 32, and a lower connector 46 which is arranged on the intermediate shaft 43 and which connects the ball spindle 40 to the intermediate shaft 43. The two connectors 44, 46 are connected to the ball spindle 40 in a non-rotating manner, such that rotational movement can be transferred from the pulley shaft 42 to the cylindrical sleeve 32 via the intermediate shaft 43 and the ball spindle 40.

A bottom portion 48 of the lower frame portion 6 comprises a vertical cylindrical drive shaft bearing 50 in which the vertical drive shaft 38 is supported. A motor (not shown) is arranged for driving a pulley 52 which is connected to the pulley shaft 42, below the drive shaft bearing 50. Lubricant is collected at the inside of the bottom portion 48 and is returned to a lubricant pump (not shown) via a lubricant return pipe 49.

The outer and inner crushing shells 12, 18 form between them a crushing chamber 51 to which material that is to be crushed is supplied. The discharge opening of the crushing chamber 51, and thereby the crushing capacity, can be adjusted by means of turning the upper frame portion 4, by means of the threads 8, 10, such that the distance between the shells 12, 18 is adjusted.

When the crusher 1 is in operation the drive shaft 38 is rotated by means of the not shown motor. The rotation of the drive shaft 38 causes the sleeve 32 to rotate and as an effect of that rotation the sleeve 32 is swung outwards by means of the unbalance weight 36, displacing the unbalance weight 36 further away from the central axis C of the crusher 1, in response to the centrifugal force to which the unbalance weight 36 is exposed. Such displacement of the unbalance weight 36 and of the cylindrical sleeve 32 to which the unbalance weight 36 is attached is allowed thanks to the ball spindle 40 and thanks to the fact that the sleeve 32 may slide somewhat, thanks to the cylindrical bearing 34, in the vertical direction along the crushing shaft 30. The combined rotation and swinging of the cylindrical sleeve 32 with unbalance weight 36 mounted thereon causes an inclination of the crushing shaft 30, and makes the crushing shaft 30 gyrate, such that material is crushed between the outer and inner crushing shells 12, 18 forming between them the crushing chamber 51.

Figure 2:
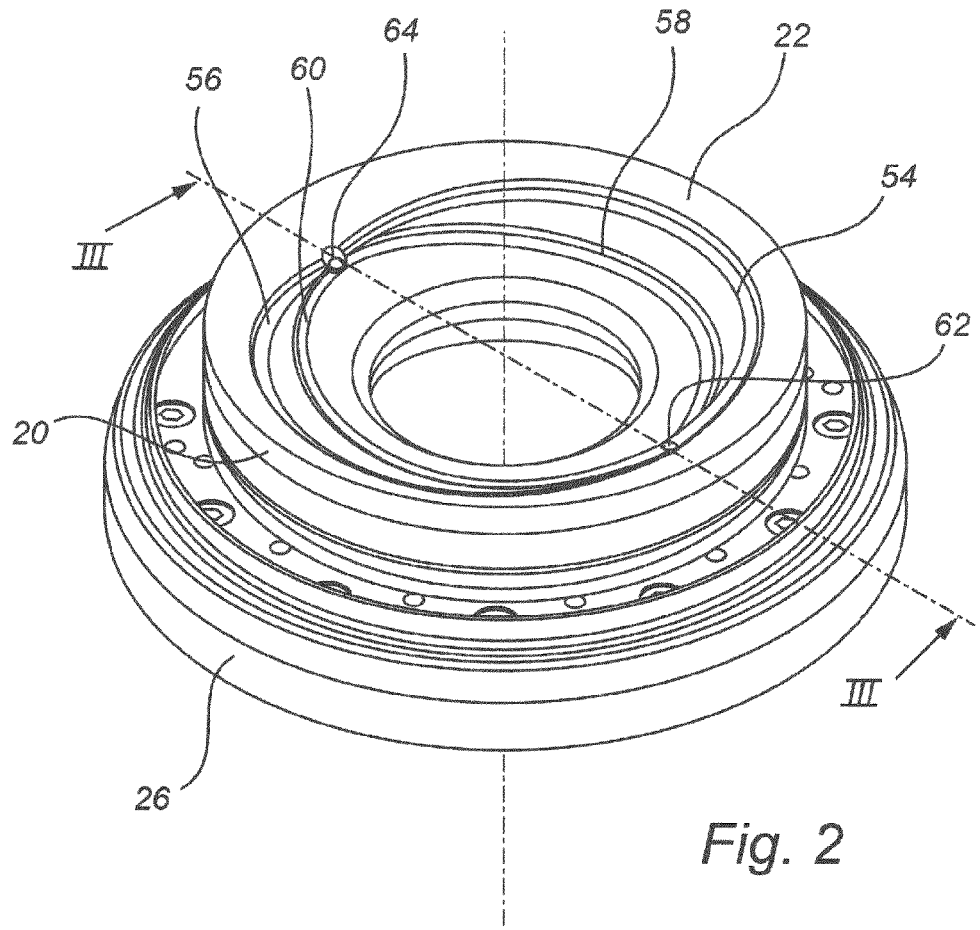
FIG. 2 is a perspective view, and illustrates a gyratory crusher bearing mounted to a bearing support.

FIG. 2 illustrates, as seen in perspective, the gyratory crusher bearing 20 mounted to a bearing support 26. The upper bearing surface 22 of the bearing 20 is provided with lubrication tracks. In the embodiment shown in FIG. 2, the bearing surface 22 is provided with a first outer lubrication track 54, a second outer lubrication track 56, a first inner lubrication track 58 and a second inner lubrication track 60. Each lubrication track 54, 56, 58, 60 formed in the bearing surface 22 may typically have a width of 5-100 mm and a depth of 2-30 mm. The lubrication tracks 54, 56, 58, 60 extend from a lubricant inlet 62 to a lubricant outlet 64. The lubricant inlet 62 and the lubricant outlet 64 are arranged in opposite ends of the bearing surface 22, by which is here meant that there is an angular separation of 160-200° between the lubricant inlet 62 and the lubricant outlet 64, as seen from above.

Hence, lubricant supplied to the bearing surface 22 enters the lubrication tracks 54, 56, 58, 60 via the lubricant inlet 62, flows over the bearing surface 22 in said tracks 54, 56, 58, 60, under cooling and lubrication of the upper bearing surface 22 and of the lower surface 24 of the crushing head 16, shown in FIG. 1, and leaves the bearing surface 22 via the lubricant outlet 64.

Figure 3:
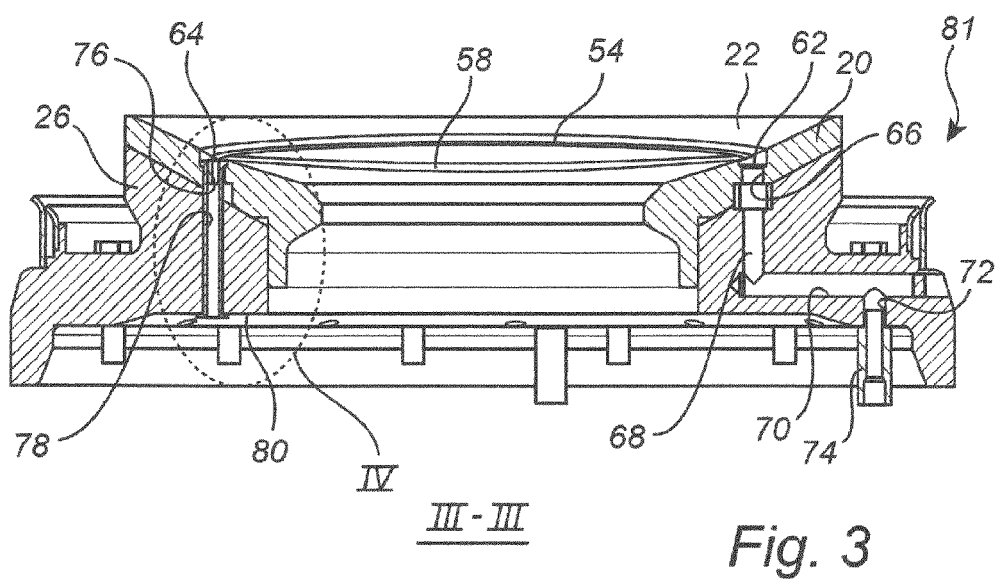
FIG. 3 is a cross-section of the gyratory crusher bearing and the bearing support of FIG. 2, as seen along the line III-Ill of FIG. 2.

FIG. 3 illustrates the crusher bearing 20 and the bearing support 26 as seen in cross-section along the line III-Ill of FIG. 2. The crusher bearing 20 comprises a lubricant supply channel 66. The lubricant inlet 62 is connected to the lubricant supply channel 66 which extends through the bearing 20 and also through the bearing support 26. In the embodiment of FIG. 3, the lubricant supply channel 66 has a first vertical portion 68, a first horizontal portion 70, and a second vertical portion 72, but it will be appreciated that many other arrangements are possible. A lubricant supply pipe 74, which is connected to a lubricant supply pump (not shown) is connected to the lubricant supply channel 66, via the second vertical portion 72, such that lubricant can be pumped to the bearing surface 22 via the lubricant inlet 62.

The crusher bearing 20 further comprises a lubricant drainage channel 76. The lubricant outlet 64 is connected to the lubricant drainage channel 76 which extends through the bearing 20 and also through the bearing support 26. A hollow combined mounting and lubricant passage bolt 78 is arranged in the lubricant drainage channel 76 and extends from the bearing surface 22, through the bearing 20, further through the bearing support 26, and ends adjacent to a lower horizontal surface 80 of the bearing support 26, as will be described in more detail hereinafter with reference to FIG. 4. Lubricant may be drained from the lubricant outlet 64, through bolt 78 and to the lower surface 80 of the bearing support 26. The lubricant then passes through the lower portion of the crusher, is collected at the bottom portion 48 shown in FIG. 1 and is, via return pipe 49, returned to the lubricant pump (not shown). When mounted together, the gyratory crusher bearing 20, the bearing support 26 and the combined mounting and lubricant passage bolt 78 holding them together form a gyratory crusher bearing arrangement 81 which is connectable to a gyratory crusher.

Figure 4:
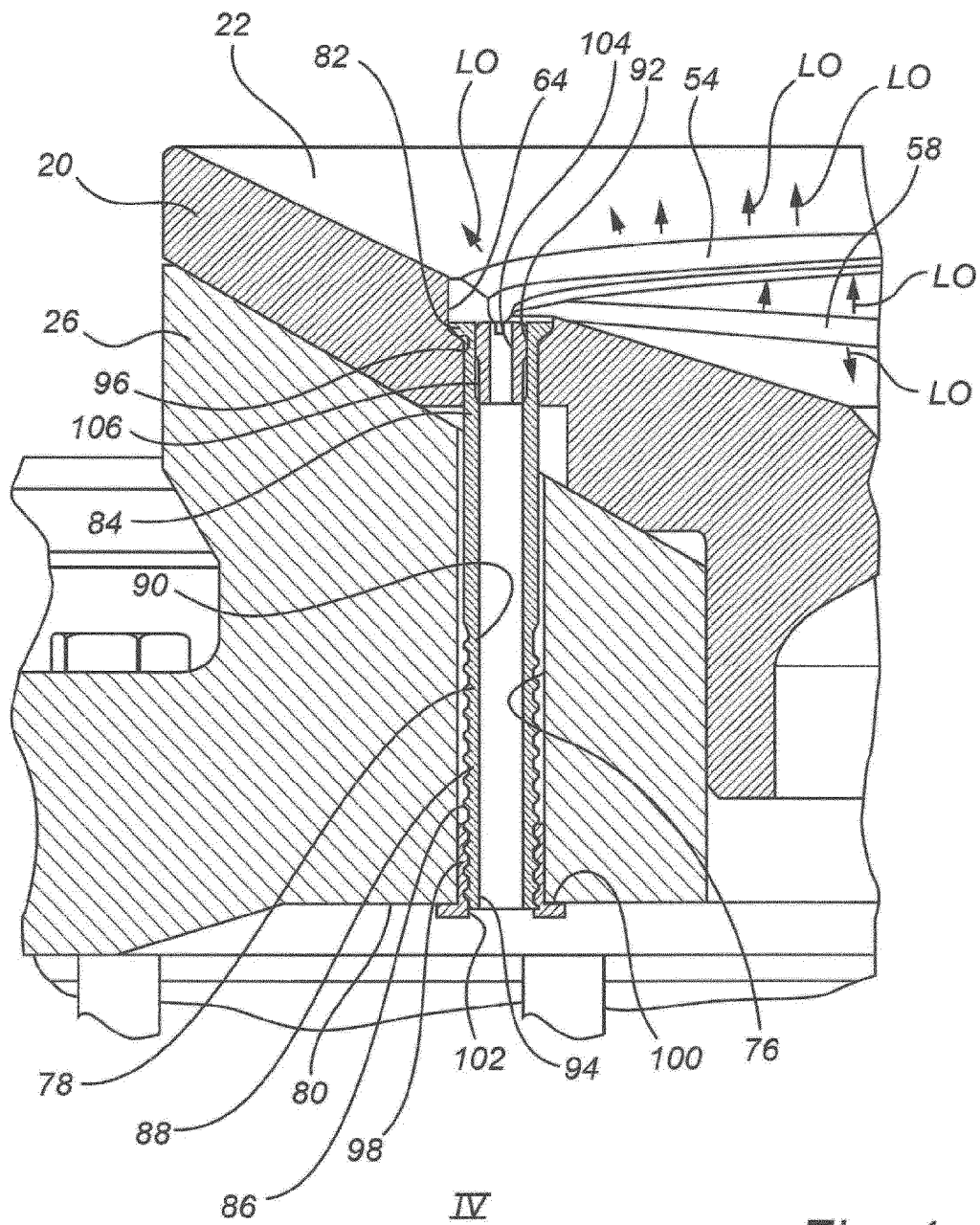
FIG. 4 is an enlargement of the area IV of FIG. 3.

FIG. 4 is an enlargement of the area IV of FIG. 3 and illustrates the hollow combined mounting and lubricant passage bolt 78 in more detail. The bolt 78 is provided with a bolt head 82, which, in the embodiment of FIG. 4, is arranged in a first end 84 of the bolt 78 adjacent to the bearing surface 22, and a threaded portion 86, which, in the embodiment of FIG. 4, is arranged in a second end 88, which is opposite to the first end 84, of the bolt 78, hence adjacent to the lower horizontal surface 80 of the bearing support 26.

The bolt 78 is provided with an inner lubricant channel 90 which extends all the way through the bolt 78. Hence, the inner lubricant channel 90 has a first opening 92 adjacent to bearing surface 22, and a second opening 94 adjacent to the lower horizontal surface 80 of the bearing support 26 to allow the lubricant to pass from the bearing surface 22 and through the bearing 20 and the bearing support 26.

The bolt head 82 abuts an abutment surface 96 of the bearing 20. A nut 98 is mounted to the threaded portion 86 of the bolt 78. The nut 98 has a nut abutment surface 100 which abuts the lower horizontal surface 80 of the bearing support 26. The nut 98 is provided with a nut opening 102 which is fluidly connected to the inner lubricant channel 90 of the bolt 78 and which makes it possible for lubricant to flow through the bolt 78, through the opening 102, and further down to the bottom portion 48 illustrated in FIG. 1, and therefrom returned to a lubricant pump.

When the nut 98 is tightened, causing the bolt head 82 to abut the abutment surface 96 and the nut abutment surface 100 abutting the lower horizontal surface 80, the bearing 20 will be firmly attached to the bearing support 26. Thereby, the bearing 20 will not come loose from the bearing support 26 during operation of the crusher. Furthermore, the bearing 20 will remain firmly fastened to the bearing support 26 also in such a situation when the crushing head 16 is lifted vertically upwards for maintenance.

The bolt 78 is provided with a flow restricting orifice 104. In the embodiment of FIG. 4, the orifice 104 is formed in an internal nut 106 which is screwed into the inner lubricant channel 90 of the bolt 78, at the first end 84 thereof. The diameter of the flow restricting orifice 104 is chosen such that the lubricant cannot freely flow through the bolt 78, but has to overcome a pressure drop caused by the orifice 104. This pressure drop will cause a certain lubricant pressure also in the lubrication tracks 54, 56, 58, 60, since the latter are, during operation of the crusher and when the lower surface 24 of the crushing head 16, shown in FIG. 1, slides over the bearing surface 22, covered by the lower surface 24. The pressure built up in the lubrication tracks 54, 56, 58, 60 will force lubricant to spread over the bearing surface 22, as indicated by arrows LO in FIG. 4, such that the entire bearing surface 22 is lubricated and cooled.

It will be appreciated that numerous variants of the embodiments described above are possible within the scope of the appended claims.

Hereinbefore it has been described that the hollow combined mounting and lubricant passage bolt 78 is arranged in the lubricant drainage channel 76. It will be appreciated that such a combined mounting and lubricant passage bolt 78 may, as alternative thereto, or in combination therewith, be arranged in the lubricant supply channel 66. Hence, in accordance with a first embodiment a combined mounting and lubricant passage bolt 78 is arranged in the drainage channel 76, in accordance with a second embodiment a combined mounting and lubricant passage bolt 78 is arranged in both channels 66, 76, and in accordance with a third embodiment a combined mounting and lubricant passage bolt 78 is mounted in the lubricant supply channel 66, but not in the drainage channel 76. In the latter case, a flow restricting orifice is suitably arranged in the drainage channel 76 such that a suitable lubricant pressure in the lubrication tracks 54, 56, 58, 60 can be achieved.

Hereinbefore it has been described that the flow restricting orifice 104 is provided as an internal nut 106 which is screwed into the bolt 78. It will be appreciated that other embodiments are also possible. For example, the flow restricting orifice 104 could, as alternative to being provided in an internal nut 106, be an integral part of the bolt 78. Furthermore, a flow restricting orifice could be formed in the actual lubricant drainage channel 76. In accordance with one embodiment a flow restricting orifice could be formed in the channel 76 adjacent to the lubricant outlet 64, the flow restricting orifice thereby being an integrated part of the bearing 20. The latter may be suitable in an embodiment in which a combined mounting and lubricant passage bolt 78 is mounted in the lubricant supply channel 66, but not in the drainage channel 76.

Hereinbefore it has been described, with reference to FIG. 4, that the the bolt 78 is provided with an inner lubricant channel 90 extending through the entire length of the bolt 78, and at the centre thereof. It will be appreciated that other types of lubricant channels 90 could also be provided in the bolt 78. For example, the lubricant channel need not extend all the way through the bolt, for example, if there is an outlet connection somewhere along the length of the bolt. Furthermore, the lubricant channel need not be arranged in the centre of the bolt, but could be arranged in one side of the bolt.

Hereinbefore it has been described that the bolt 78 is tightened by means of a nut 98. It will be appreciated that the bolt 78 may be tightened in other manners as well. For example, the bolt 78 may be tightened by the threaded portion 86 of the bolt 78 co-operating with a threaded portion formed in the bearing support 26, inside the drainage channel 76.

Hereinbefore it has been described that the gyratory crusher is of the inertia cone crusher type. It will be appreciated that the principles described above may be applied to gyratory crushers of other types as well.

The invention claimed is:

1. A gyratory crusher bearing for carrying a crushing head of a gyratory crusher of the type having an inner crushing shell supported by the crushing head, and an outer crushing shell supported on a crusher frame, wherein the gyratory crusher bearing is connectable to a bearing support arranged on the crusher frame of the gyratory crusher, the gyratory crusher bearing comprising:
    a lubricant supply channel extending through at least a part of the gyratory crusher bearing and ending at a bearing surface of the gyratory crusher bearing; and
    a lubricant drainage channel extending through at least a part of the gyratory crusher bearing and starting at the bearing surface, wherein at least one of the lubricant supply channel and the lubricant drainage channel is arranged for housing a combined mounting and lubricant passage bolt holding the gyratory crusher bearing to the bearing support.

2. A gyratory crusher bearing according to claim 1, further comprising an abutment surface co-operating with the combined mounting and lubricant passage bolt.

3. A gyratory crusher bearing according to claim 1, wherein at least one of the lubricant supply channel and the lubricant drainage channel of the gyratory crusher bearing is provided with an abutment surface for co-operating with the combined mounting and lubricant passage bolt.

4. A gyratory crusher bearing according to claim 1, wherein the gyratory crusher bearing is connectable to a flow restricting orifice restricting the flow of lubricant through the lubricant drainage channel, and further comprising a flow restricting orifice restricting the flow of lubricant through the lubricant drainage channel.

5. A gyratory crusher bearing according to claim 1, wherein the lubricant drainage channel is arranged for housing the combined mounting and lubricant passage bolt holding the gyratory crusher bearing to the bearing support.

6. A gyratory crusher bearing according to claim 1, wherein a lubricant inlet is arranged in the bearing surface and is connected to the lubricant supply channel, and a lubricant outlet is arranged in the bearing surface and is connected to the lubricant drainage channel, wherein the lubricant inlet and the lubricant outlet are arranged in opposite ends of the bearing surface.

7. A gyratory crusher bearing according to claim 1, wherein the bearing surface is arranged to be in contact with a lower surface of the crushing head, and wherein at least one lubrication track extends over at least a portion of the bearing surface from a position adjacent to the lubricant supply channel to a position adjacent to the lubricant drainage channel.

8. A gyratory crusher bearing according to claim 1, wherein the gyratory crusher bearing comprises a material selected from the group of materials consisting of: metals, metal alloys, ceramics, polymers.

9. A gyratory crusher bearing arrangement comprising:
    a gyratory crusher bearing including a lubricant supply channel extending through at least a part of the gyratory crusher bearing and ending at a bearing surface of the gyratory crusher bearing and a lubricant drainage channel extending through at least a part of the gyratory crusher bearing and starting at the bearing surface;
    a bearing support; and
    a combined mounting and lubricant passage bolt arranged in at least one of the lubricant supply channel and the lubricant drainage channel of the gyratory crusher bearing and fixing the gyratory crusher bearing to the bearing support.

10. A gyratory crusher bearing arrangement according to claim 9, wherein the combined mounting and lubricant passage bolt is arranged in the lubricant drainage channel.

11. A gyratory crusher bearing arrangement according to claim 9, wherein the combined mounting and lubricant passage bolt includes a lubricant channel via which lubricant may pass by the bolt, preferably the lubricant channel of the bolt being an inner lubricant channel that extends through the centre of the bolt.

12. A gyratory crusher bearing arrangement according to claim 9, wherein the combined mounting and lubricant passage bolt includes a flow restricting orifice restricting the flow of lubricant through the bolt.

13. A gyratory crusher bearing arrangement according to claim 12, wherein the flow restricting orifice is formed in an internal nut which is screwed into the lubricant channel of the bolt.

14. A gyratory crusher comprising:
    an inner crushing shell supported by a crushing head;
    an outer crushing shell supported on a crusher frame;
    a gyratory crusher bearing including a lubricant supply channel extending through at least a part of the gyratory crusher bearing and ending at a bearing surface of the gyratory crusher bearing and a lubricant drainage channel extending through at least a part of the gyratory crusher bearing and starting at the bearing surface; and
    a gyratory crusher bearing arrangement supporting the crushing head, the gyratory crusher bearing arrangement including a bearing support and a combined mounting and lubricant passage bolt arranged in at least one of the lubricant supply channel and the lubricant drainage channel of the gyratory crusher bearing and fixing the gyratory crusher bearing to the bearing support.

15. A method of mounting a gyratory crusher bearing for carrying a crushing head of a gyratory crusher including an inner crushing shell supported by the crushing head, and an outer crushing shell is supported on a crusher frame, the method comprising:
    arranging the gyratory crusher bearing on a bearing support arranged on the crusher frame of the gyratory crusher;
    inserting a combined mounting and lubricant passage bolt into at least one of a lubricant supply channel extending through at least a part of the gyratory crusher bearing f and ending at a bearing surface of the gyratory crusher bearing, and a lubricant drainage channel q extending through at least a part of the gyratory crusher bearing and starting at the bearing surface of the gyratory crusher bearing; and
    tightening the combined mounting and lubricant passage bolt to press the gyratory crusher bearing towards the bearing support.

\* \* \* \* \*